United States Patent [19]
Chung

[11] Patent Number: 6,024,672
[45] Date of Patent: Feb. 15, 2000

[54] SHIFT CONTROL METHOD FOR AN AUTOMATIC TRANSMISSION

[75] Inventor: Woo-won Chung, Kyungki-do, Rep. of Korea

[73] Assignee: Hyundai Motor Company, Seoul, Rep. of Korea

[21] Appl. No.: 09/060,072

[22] Filed: Apr. 15, 1998

[51] Int. Cl.⁷ .................................................. F16H 61/04
[52] U.S. Cl. .................... 477/140; 477/132; 477/135; 477/144; 475/128
[58] Field of Search .................................. 477/143, 144, 477/135, 136, 132, 133, 140, 141; 475/128; 74/335, 336 R

[56] References Cited

U.S. PATENT DOCUMENTS

| | | | |
|---|---|---|---|
| 4,913,004 | 4/1990 | Panoushek et al. | 74/335 X |
| 5,067,373 | 11/1991 | Kyohzuka et al. | 74/866 |
| 5,320,000 | 6/1994 | Marusue et al. | 477/154 |
| 5,370,016 | 12/1994 | Fujita et al. | 74/36 R |
| 5,490,063 | 2/1996 | Genise | 74/335 X |
| 5,536,216 | 7/1996 | Jang . | |
| 5,624,351 | 4/1997 | Fujita et al. | 477/133 X |
| 5,647,819 | 7/1997 | Fujita et al. | 477/143 |
| 5,868,033 | 2/1999 | Nishino et al. | 74/336 R X |

FOREIGN PATENT DOCUMENTS 59-159452  9/1984  Japan ..................................... 477/143

Primary Examiner—Charles A. Marmor
Assistant Examiner—Ha Ho

[57] ABSTRACT

A shift control method for an automatic transmission not equipped to undergo skip shifting. Various skip shifting patterns are realized by detecting changes in turbine RPM, and delaying shifting if it is determined that turbine RPM are irregular, thereby achieving a normal shift pattern.

8 Claims, 5 Drawing Sheets

SHIFT CONTROL METHOD FOR AN AUTOMATIC TRANSMISSION

BACKGROUND OF THE INVENTION (a) Field of the Invention

The present invention relates to an automatic transmission, and more particularly, to a shift control method for an automatic transmission which improves shift responsiveness of the same to enhance ride quality.

(b) Description of Related Art

An automatic transmission provides necessary gear ratios to adapt vehicle operation to a wide range of speeds and loads. It does this with a minimum amount of effort on the part of the driver. That is, automatic upshifts and downshifts are made convenient for the driver because a foot-operated clutch is not required to shift gears, because the vehicle can be brought to a stop without the use of a clutch, and without shifting the transmission into neutral.

A conventional automatic transmission for a vehicle comprises a torque converter provided between an engine and the transmission to act as the fluid link therebetween. The torque converter has an impeller, a turbine, and a stator. A gear train is connected to the torque converter to provide various forward speed ranges and reverse; a plurality of friction members such as disc clutches and one-way clutches which control gear action, are provided. A hydraulic control system is provided for controlling the operation of the friction members.

Although the automatic transmission is somewhat complicated in structure and manufacture of the same is difficult, because of its many advantages over the manual transmission (e.g., convenience to the driver, improved ride comfort, reduced fuel consumption, etc) automatic transmissions are widely used and manufacturers of vehicles continue to put forth much effort in their development.

One area of concentration in the development of automatic transmissions has been that of skip shifting. Namely, automatic transmissions are now able to undergo 3-1 closed-throttle downshifting, 4-2 and 3-1 full-throttle forced downshifting, 2-4 closed-throttle upshifting, and other such skip-shifting patterns.

Before such development, when quickly shifting from a fourth speed to a second speed, for example, shifting would occur first into the third speed, then before shifting into the third speed was completed, shifting was realized into the second speed. Another method was the direct shifting into the second speed after temporary shifting into a neutral N range. In either case, shift quality was poor.

A typical example of a prior art automatic transmission which solves the above problem by enabling skip shifting is U.S. Pat. No. 5,536,216. FIGS. 1 and 7 of U.S. Pat. No. 5,536,216, illustrate, respectively, a hydraulic circuit diagram of U.S. Pat. No. 5,536,216 and a hydraulic circuit diagram of the prior art automatic transmission in which skip shifting is not possible. Because plurality of valves are added to the hydraulic control system of U.S. Pat. No. 5,536,216, the hydraulic circuit diagram of the same is much more complicated than that of the prior art hydraulic control system in which skip shifting is not possible.
This results in a difficult manufacturing process and an increase in overall manufacturing costs.

SUMMARY OF THE INVENTION

The present invention has been made in an effort to solve the above problems. It is an object of the present invention to provide a shift control method for an automatic transmission which improves shift responsiveness of the automatic transmission to enhance ride quality. The shift control method uses a shift control logic of a transmission control unit such that shifting to speeds suitable for all driving conditions, including skip shifting, is possible.

To achieve the above object, the present invention provides a shift control method for an automatic transmission controlling a hydraulic control system for an automatic transmission incapable of skip shifting, wherein various skip shifting patterns are realized by detecting changes in turbine RPM. Shifting is delayed if it is determined that the turbine RPM is irregular, thereby achieving a normal shift pattern.

BRIEF DESCRIPTION OF THE DRAWINGS

These and other features, aspects, and advantages of the present invention will become better understood with regard to the following description, appended claims, and accompanying drawings where:

DETAILED DESCRIPTION OF THE PREFERRED EMBODIMENTS

A preferred embodiment of the present invention will now be described in detail with reference to the accompanying drawings.

In the present invention, a shift control method is applied to a prior art hydraulic control system in which skip shifting is not possible. For a better understanding of the present invention, changes in the hydraulic pressure operating on each friction element of this prior art hydraulic control system will be first described.

Figure 6:
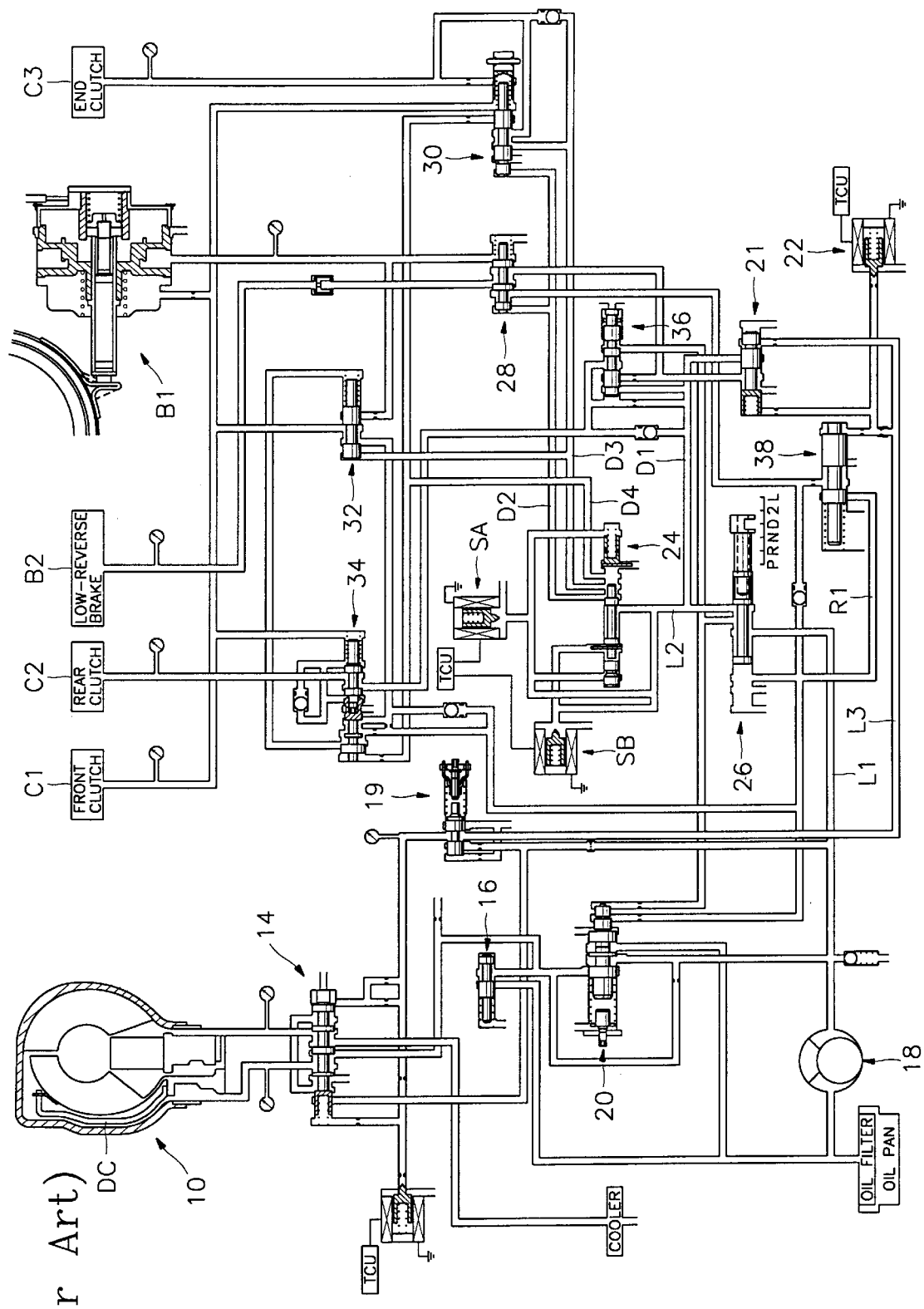
FIG. 6 is a hydraulic circuit diagram of a prior art hydraulic control system in which skip shifting is not possible.

Referring first to FIG. 6, a hydraulic circuit diagram of the above prior art hydraulic control system is shown. This drawing is identical to FIG. 7 appearing in U.S. Pat. No. 5,536,216, and the same reference numerals and letters will be used herein.

In the hydraulic control system of FIG. 6, a plurality of solenoid valves are controlled to operate by a transmission control unit (TCU) to undergo port conversion. Accordingly, hydraulic pressure is either supplied to or released from friction elements to realize shifting into different shift ranges.

Control by the TCU is determined by a predetermined shift pattern. The shift pattern is determined for shifting into suitable shift ranges according to changes in throttle valve opening and vehicle speed, and the relation between the two. Namely, as shown in the graph of FIG. 1, shifting into first, second, third, and fourth speeds occurs at different ratios of throttle opening and vehicle speed (i.e. when the intersection of throttle opening and vehicle speed in the graph falls within an area of one of the speeds).

Referring back to FIG. 6, control of shift ranges by the above hydraulic control system is realized by port conversion of a shift control valve 24. The shift control valve 24 is controlled by operation of two shift control solenoid valves SA and SB, which, in turn, are controlled by the TCU. The shift control solenoid valves SA and SB are operated to ON and OFF states by the TCU for the different speeds as shown in the following table.

|  | SA | SB |
|---|---|---|
| 1$^{st}$ speed | ON | ON |
| 2$^{nd}$ speed | OFF | ON |
| 3$^{rd}$ speed | OFF | OFF |
| 4$^{th}$ speed | ON | OFF |

Figure 1:
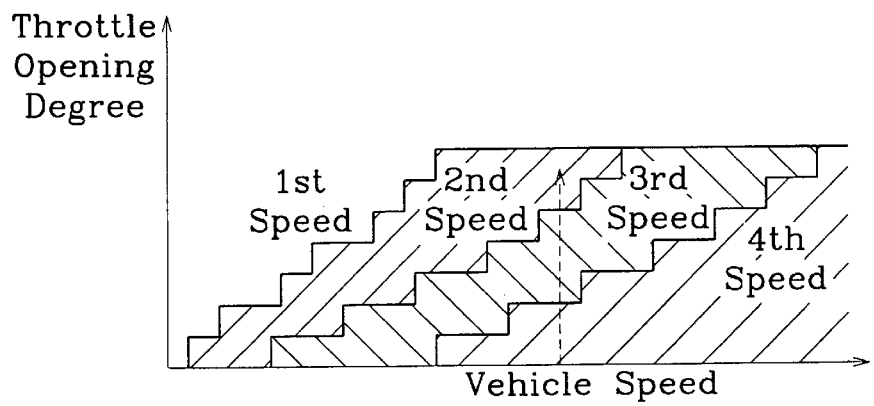
FIG. 1 is a graph illustrating a shift control pattern with relation to throttle opening and vehicle speed according to a preferred embodiment of the present invention.

In sum, the TCU analyzes the present driving state of the vehicle then controls each solenoid valve SA and SB to achieve the predetermined shift pattern of FIG. 1. Namely, by the operation of each solenoid valve, valves which the solenoid valves control realize port conversion such that hydraulic pressure is supplied to or released from friction elements, thereby realizing shifting into the different shift ranges.

Figure 2:
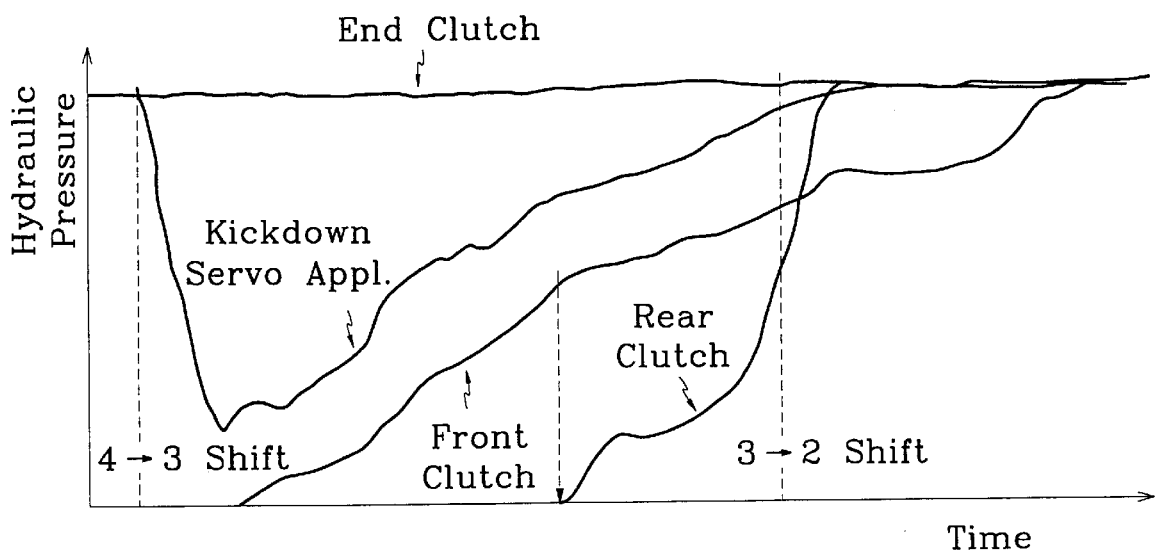
FIG. 2 is a graph illustrating changes in operational pressure of friction elements when 4-3 shifting according to a preferred embodiment of the present invention.

FIG. 2 is a graph illustrating changes in the operational pressure of friction elements when 4-3 shifting according to a preferred embodiment of the present invention. When shifting into the third speed from the fourth speed, the TCU controls this shift process. Accordingly, each solenoid valve is controlled to ON and OFF states such that each valve undergoes port conversion. As a result, hydraulic pressure is either supplied to or released from each friction element. Here, the change in the supply of hydraulic pressure to each friction element is not abrupt, but performed slowly at predetermined rates and with delay times for each friction element.

Namely, a low-reverse brake B2 remains in an un-operated state. An end clutch C3 is maintained in an operating state. Hydraulic pressure supplied to an application chamber of a kickdown servo B1 is momentarily reduced then again slowly increased. Hydraulic pressure supplied to a front clutch C1 is slowly increased, and hydraulic pressure is abruptly supplied to a rear clutch C2 at a middle point of shifting. At the end of shifting, hydraulic pressure supplied to all the above friction elements reaches a predetermined level, thereby completing shifting into the third speed.

In the above, the point at which hydraulic pressure is abruptly supplied to the rear clutch C2 is the moment at which a rear clutch exhaust valve 34 realizes port conversion.

Figure 3:
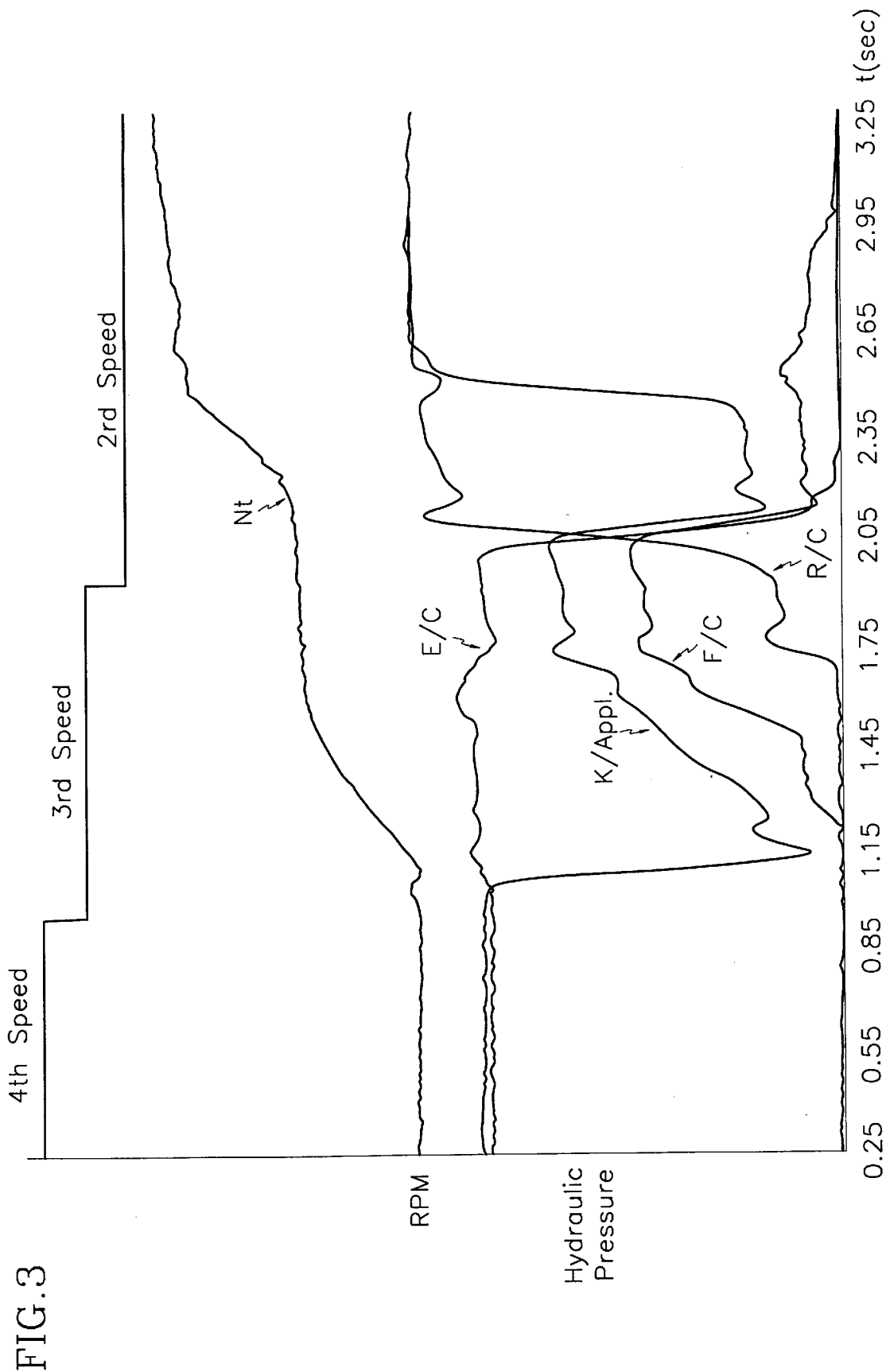
FIG. 3 is a graph illustrating changes in operational pressure of friction elements and turbine RPM during a normal shift pattern when 4-3-2 shifting.
Figure 4:
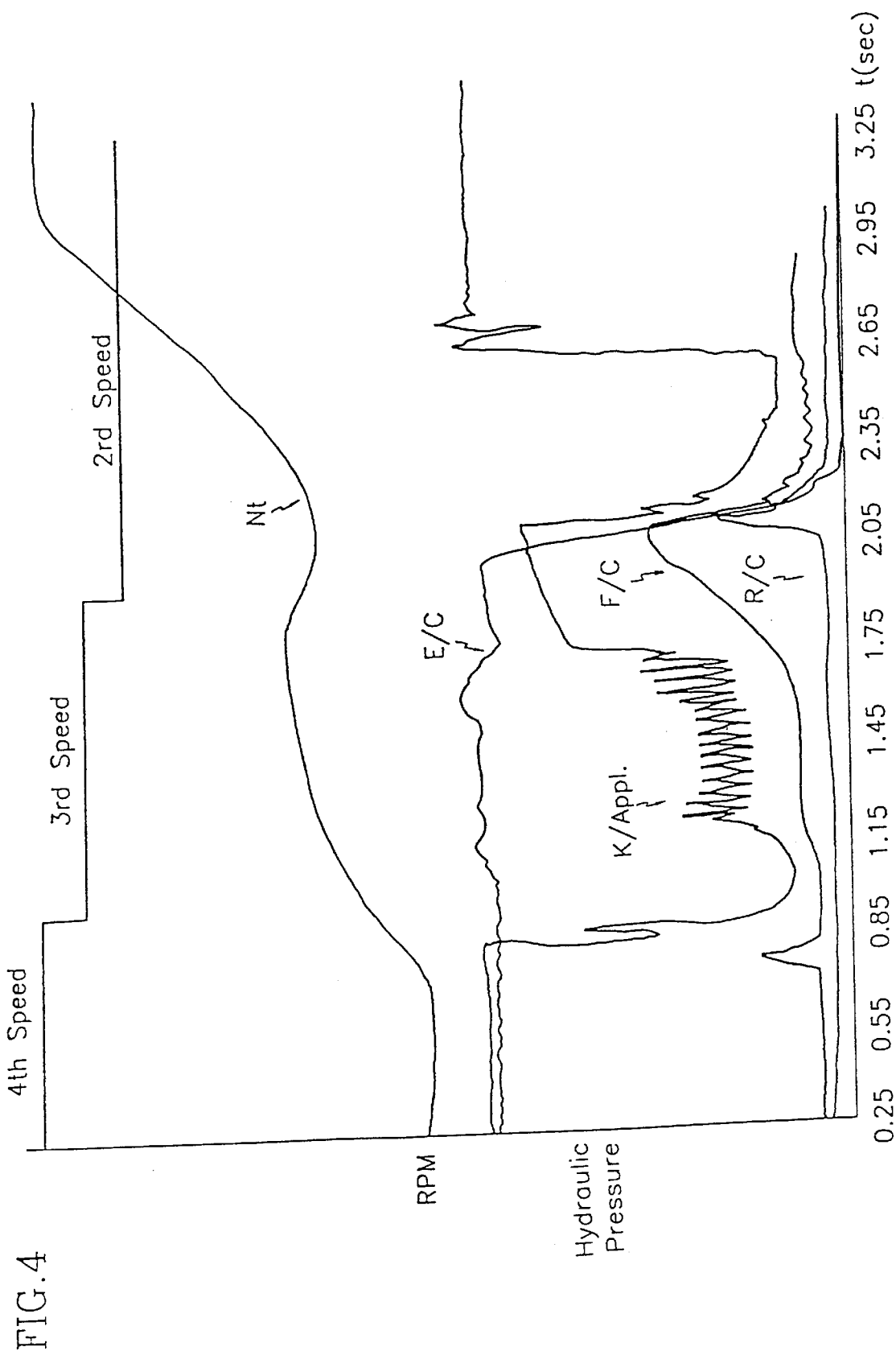
FIG. 4 is a graph illustrating changes in operational pressure of friction elements and turbine RPM during an irregular shift pattern when 4-3-2 shifting.

FIGS. 3 and 4, are graphs illustrating changes in operational pressure of friction elements and turbine RPM during a normal and irregular shift pattern, respectively, when 4-3-2 shifting. In the drawings, Nt refers to turbine RPM, E/C indicates hydraulic pressure changes in the end clutch C3, K/Appl. Indicates hydraulic pressure changes in the application chamber of the kickdown servo B1, F/C indicates hydraulic pressure changes in the front clutch C1, and R/C indicates hydraulic pressure changes in the rear clutch C2.

In FIG. 3, 4-2 shifting is performed sequentially in a 4-3-2 pattern by the TCU. Namely, in a normally shifting pattern, hydraulic pressure is formed in the front clutch C1 then slowly formed in the rear clutch C2 to realize 4-3 shifting. Next, hydraulic pressure is released from the front clutch C1, thereby realizing shifting into the second speed.

However, such sequential shifting into the third speed then the second speed is not possible during real driving conditions. That is, hydraulic pressure is not ideally supplied to the friction elements for realizing a smooth shift pattern. Instead, is supplied to the friction elements in an irregular fashion, as shown in FIG. 4, such that the transmission is shifted temporarily in a neutral N range, resulting in an abrupt increase engine RPM and a deterioration in shift quality.

As shown in FIG. 4, a predetermined level of pressure is surpassed in the front clutch C1 when 4-3 shifting, and hydraulic pressure is supplied in the rear clutch C2. But before the completion of hydraulic pressure formation in the rear clutch C2, the TCU causes shifting into the second speed.

Accordingly, hydraulic pressure supplied to the rear clutch C2 is exhausted, and, in a state where pressure is not supplied to any of the friction elements, shifting occurs into the neutral N range.

This causes a change in turbine RPM (Nt) to occur. That is, in the normal shift pattern of FIG. 3, turbine RPM slowly increase throughout the shift process. However as shown in FIG. 4, turbine RPM initially increases until the TCU causes shifting into the second speed. Here, before shifting into the second speed, shifting into the neutral N range occurs momentarily such that turbine RPM decreases as shown in FIG. 4. As a result, engine RPM abruptly increases and the quality of shifting decreases.

Accordingly, in the present invention, if a value of turbine RPM (Nt) differentiated by time (i.e., dNt/dt) falls below zero during any segment of 4-3 shifting, the formation of pressure in the rear clutch C2, according to the formation of pressure in the front clutch C1, is irregular. As a result, shifting is delayed for a suitable amount of time both for 4-3 and 3-2 shifting. Namely, shifting into the second speed from the third speed is realized after a normal amount of hydraulic pressure is supplied to the rear clutch C2, thereby preventing temporarily shifting into the neutral N range.

In other words, the present invention permits skip shifting in automatic transmission normally incapable of skip shifting. Further, this is accomplished in the present invention in a simple manner, not with the addition of valves and other such changes in the structure of the hydraulic control system, but by utilizing a TCU control logic.

Figure 5:
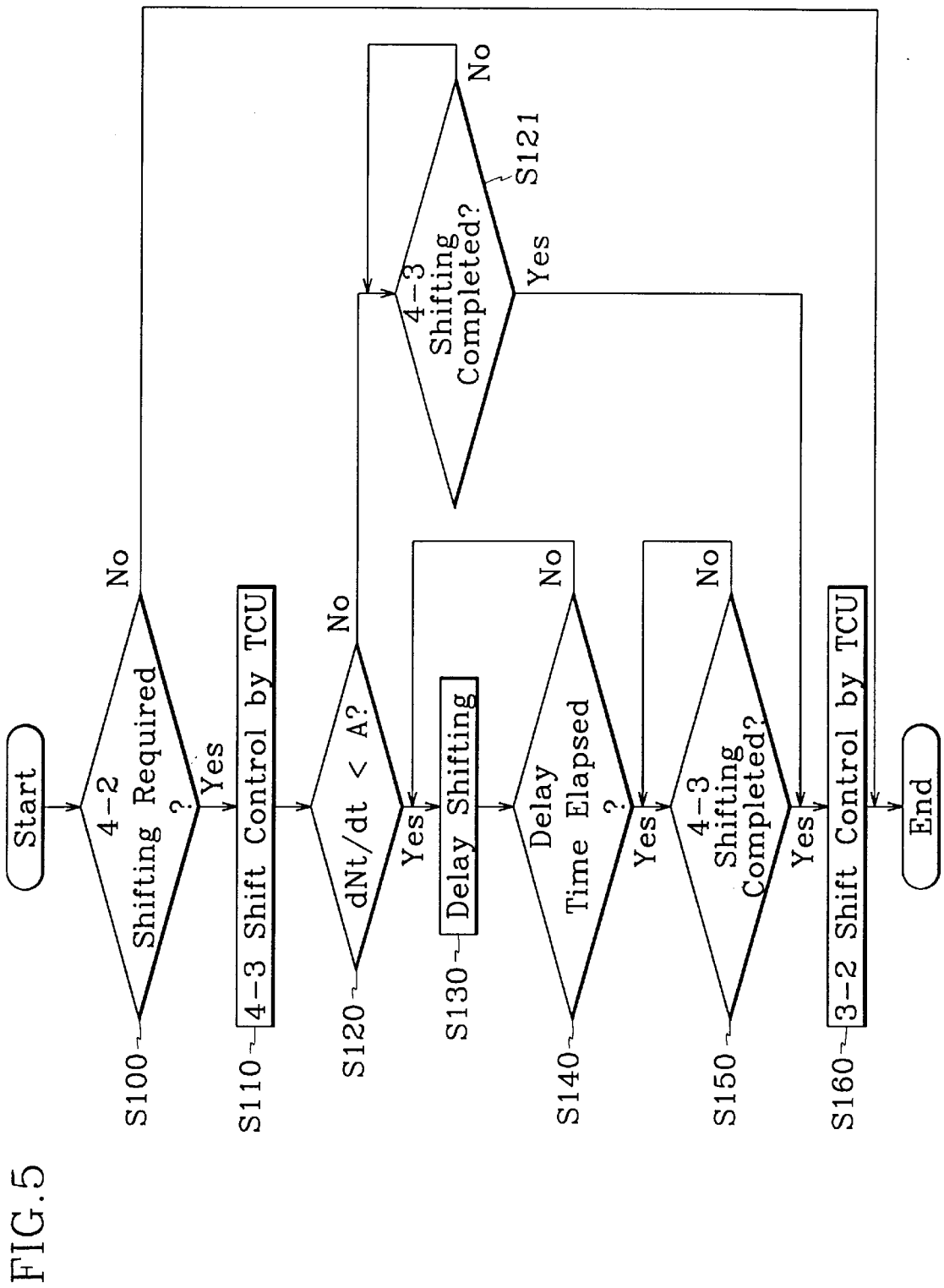
FIG. 5 is a flow chart of a shift control method according to a preferred embodiment of the present invention.

FIG. 5 is a flow chart of the shift control method according to a preferred embodiment of the present invention.

In step 100 of the shift control method, it is first determined if driving conditions are such that 4-2 shifting is required. If so, the TCU performs 4-3 shifting in step 110. During 4-3 shifting, it is determined if a time differentiated value (dNt/dt) of turbine RPM (Nt) is larger than a predetermined value (A) in step 120. If it is not, as this indicates normal shifting into the third speed, it is determined if shifting into the third speed is completed in step 121.

In step 120, if it is determined that the time differentiated value (dNt/dt) of turbine RPM (Nt) is less than the predetermined value (A), shifting is delayed by as much as the 4-3 delay time in step 130. Next, in step 140, it is determined if the delay time has elapsed. Then, in step 150 it is determined if 4-3 shifting is completed. Finally, 3-2 shifting is performed in step 160.

In the above, although 4-2 skip shifting is used as an example, other skip shifting patterns such as 3-1, 1–3, 2–4, etc. are possible with the inventive shift control method according to the presently disclosed invention. In these other skip shift patterns, as with 4-2 skip shifting used as the example above, it is determined if, a time differentiated value (dNt/dt) of Nt is smaller than a predetermined value to check if an irregular shift pattern is being followed, then shift timing is delayed such that a normal shift pattern can be realized.

In the shift control method of the present invention described above, as skip shifting is realized by application of the shift control method to transmissions not equipped to enable skip shifting. The hydraulic control system is therefore uncomplicated and manufacturing costs are reduced.

While this invention has been described in connection with what is presently considered to be the most practical and preferred embodiment, it is to be understood that the invention is not limited to the disclosed embodiment, but, on the contrary, is intended to cover various modifications and equivalent arrangements included within the spirit and scope of the appended claims.

What is claimed is:

1. A shift control method for an automatic transmission comprising the steps of:

determining if shifting two speeds below a speed M is required;

shifting to one speed below the speed M if shifting two speeds below speed M is required:

determining if a time differentiated value (dNt/dt) of a turbine RPM (Nt) is smaller than a predetermined value (A);

delaying shifting for an established delay time period if the time differentiated value (dNt/dt) of the turbine RPM (Nt) is smaller than the predetermined value (A);

determining if the established delay time period has elapsed;

determining if shifting to one speed below the speed M is completed; and shifting to two speeds below the speed M if shifting to one speed below the speed M is completed.

2. The shift control method of claim 1, wherein if the time differentiated value (dNt/dt) of the turbine RPM (Nt) is larger than the determined value (A), determining if shifting to one speed lower than the speed M is completed, and if shifting to one speed lower than the speed M is completed, shifting to two speeds lower than the speed M.

3. The shift control method of claim 1 wherein the speed M is a fourth speed of a drive D range of the automatic transmission.

4. The shift control method of claim 1, wherein the speed M is a third speed of a drive D range of the automatic transmission.

5. A shift control method for an automatic transmission comprising the steps of:

determining if shifting two speeds above a speed M is required;

shifting to one speed above the speed M if shifting two speeds above speed M is required:

determining if a time differentiated value (dNt/dt) of a turbine RPM (Nt) is larger than a predetermined value (A);

delaying shifting for an established delay time period if the time differentiated value (dNt/dt) of the turbine RPM (Nt) is larger than the predetermined value (A);

determining if the established delay time period has elapsed;

determining if shifting to one speed above the speed M is completed; and shifting to two speeds above the speed M if shifting to one speed above the speed M is completed.

6. The shift control method of claim 5, wherein if the time differentiated value (dNt/dt) of the turbine RPM (Nt) is smaller than the predetermined value (A), determining if shifting to one speed higher than the speed M is completed, and if shifting to one speed higher than the speed M is completed, shifting to two speeds higher than the speed M.

7. The shift control method of claim 5, wherein the speed M is a first speed of a drive D range of the automatic transmission.

8. The shift control method of claim 5, wherein the speed M is a second speed of a drive D range of the automatic transmission.

* * * * *